(12) United States Patent
Mathew

(10) Patent No.: US 9,979,502 B2
(45) Date of Patent: May 22, 2018

(54) APPARATUS AND METHOD FOR SAMPLE CLOCK CORRECTION

(71) Applicant: Keysight Technologies Signapore (Holdings) PTE. LTD., Minneapolis, MN (US)

(72) Inventor: Binu Mathew, Hampshire (GB)

(73) Assignee: Keysight Technologies Singapore (Holdings) Pte. Ltd., Wilkie Edge (SG)

( * ) Notice: Subject to any disclaimer, the term of this patent is extended or adjusted under 35 U.S.C. 154(b) by 0 days. days.

(21) Appl. No.: 14/758,216

(22) PCT Filed: Nov. 21, 2013

(86) PCT No.: PCT/GB2013/053077
§ 371 (c)(1),
(2) Date: Jun. 26, 2015

(87) PCT Pub. No.: WO2014/108663
PCT Pub. Date: Jul. 17, 2014

(65) Prior Publication Data
US 2015/0358097 A1 Dec. 10, 2015

(30) Foreign Application Priority Data

Jan. 10, 2013 (GB) .................................. 1300420.5

(51) Int. Cl.
*H04J 3/06* (2006.01)
*H04B 1/40* (2015.01)

(52) U.S. Cl.
CPC .............. *H04J 3/0685* (2013.01); *H04B 1/40* (2013.01)

(58) Field of Classification Search
CPC combination set(s) only.
See application file for complete search history.

(56) References Cited

U.S. PATENT DOCUMENTS 6,463,110 B1 10/2002 Rinderknecht et al.
2002/0085489 A1 7/2002 Sartain et al.
(Continued)

OTHER PUBLICATIONS

Great Britain Search Report dated Jun. 26, 2013, regarding GB Application No. GB1300420.5.
(Continued)

*Primary Examiner* — Frank Duong

(57) ABSTRACT

A radio transceiver apparatus configured to transmit and receive radio frequency signals, the apparatus comprising, a sample clock configured to generate samples at a clock frequency $f_s$, a processor configured to generate a transmission data stream signal, wherein the transmission data stream signal comprises frames separated by frame boundaries between the frames, and wherein the frames are comprised of at least one sample, and a sample clock correction unit, wherein in a first transmission configuration when the clock frequency $f_s$ is greater than a desired clock frequency $f_r$, the sample clock correction unit is configured to insert at least one sample into at least one frame boundary between frames, or in a second transmission configuration when the clock frequency $f_s$ is less than a desired clock frequency $f_r$, the sample clock correction unit is configured to remove at least one sample from at least one frame boundary between the frames.

16 Claims, 5 Drawing Sheets

(56) References Cited

U.S. PATENT DOCUMENTS

| | | |
|---|---|---|
| 2002/0129379 A1 | 9/2002 | Levinson et al. |
| 2005/0180405 A1* | 8/2005 | Bastin .................. G10L 19/005 370/352 |
| 2007/0223605 A1 | 9/2007 | Voltz et al. |
| 2009/0190701 A1 | 7/2009 | Nekhamkin et al. |

OTHER PUBLICATIONS

International Preliminary Report on Patentability dated Jul. 14, 2015, and Written Opinion dated Jan. 31, 2014 regarding PCT/GB2013/053077.

International Search Report dated Jan. 31, 2014 regarding PCT/GB2013/053077.

* cited by examiner

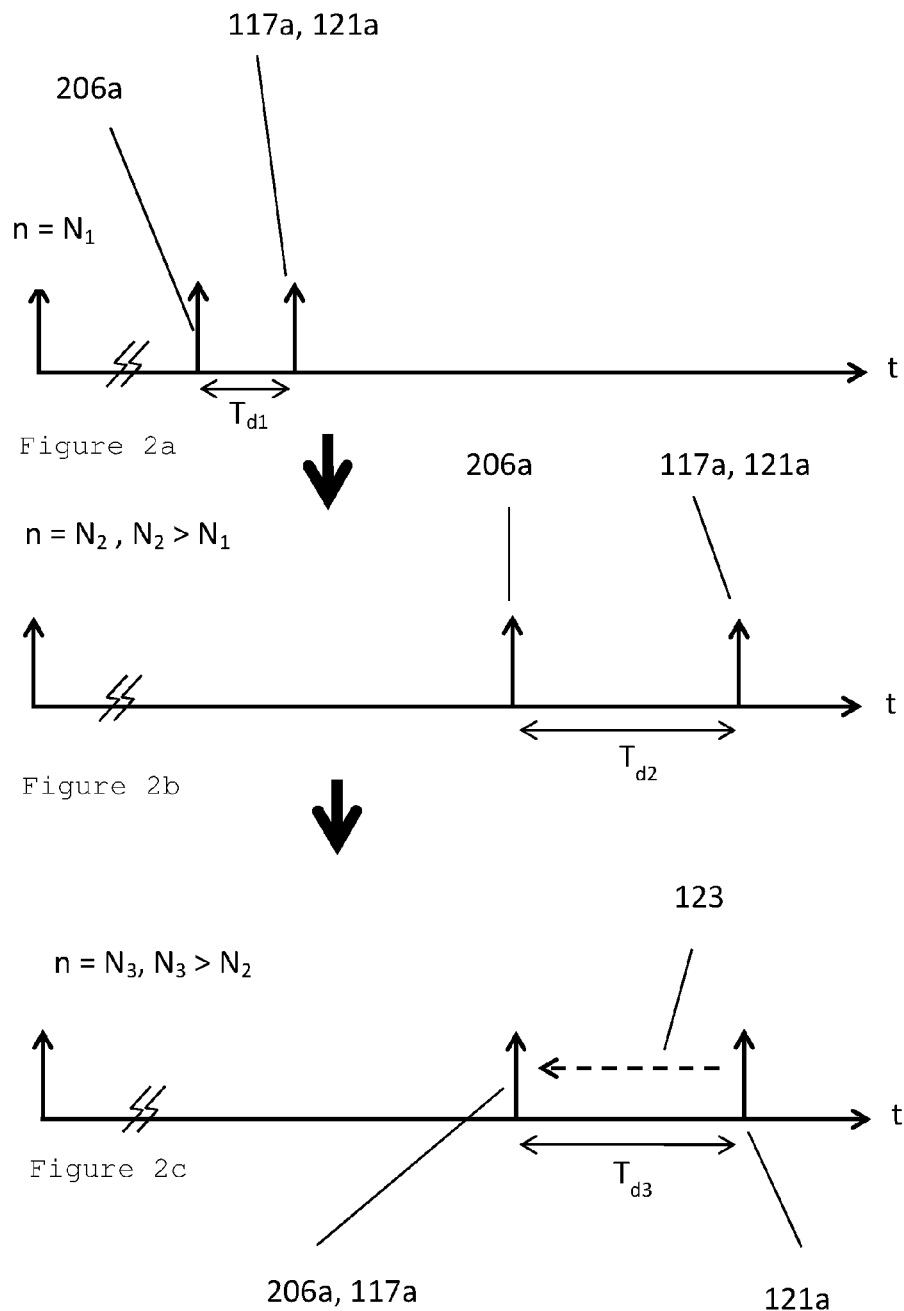

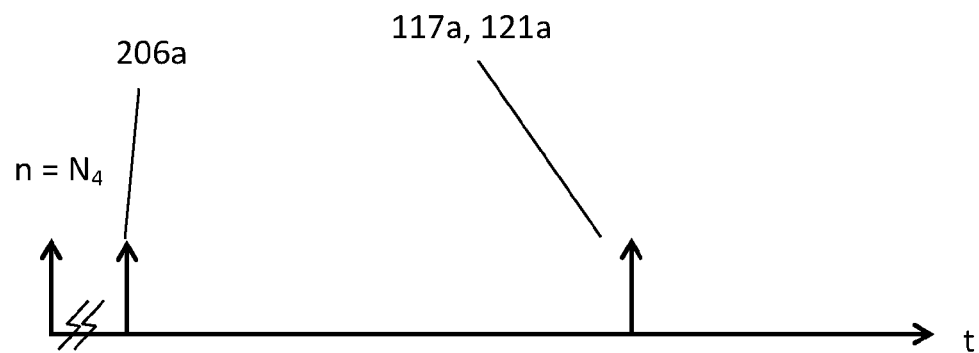
Figure 3a
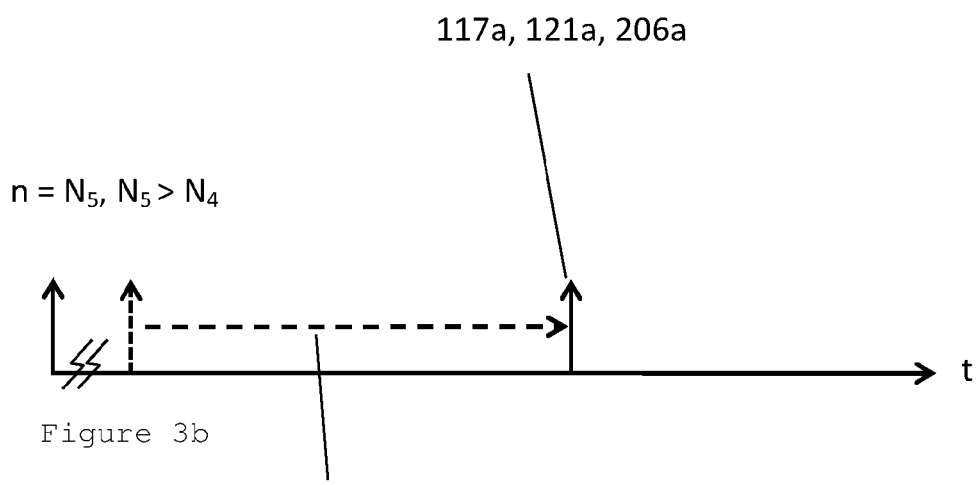
Figure 3b

APPARATUS AND METHOD FOR SAMPLE CLOCK CORRECTION

CROSS-REFERENCE TO RELATED APPLICATIONS

This application is the National Stage filing under 35 U.S.C. 371 of International Application No. PCT/GB2013/053077, filed on Nov. 21, 2013, which claims the benefit of earlier filing date and right of priority to United Kingdom (Great Britain) Application Serial No. 1300420.5, filed on Jan. 10, 2013, the contents of all of which are expressly incorporated by reference herein in their entireties.

FIELD OF THE INVENTION

This invention relates to apparatus and methods for sample clock correction, and particularly to apparatus and methods for correcting for an error in sample clock frequency of wireless radio transceiver systems.

DESCRIPTION OF THE RELATED ART

Baseband sampling clock and Radio Frequency (RF) clock frequencies within a radio transceiver system should be precisely related, and are usually generated from, or locked to, the same reference clock.

The reference clock frequency needs to be accurately provided to ensure that errors in timing are not caused within user equipment in communication with the radio transceiver system. If the reference clock frequency is not accurately generated, a drift in baseband timing will be noticeable at the user equipment receiver.

This drift in timing between the radio transceiver system and the user equipment can lead to wireless communication between the radio transceiver system and the user equipment to drop in quality, become disrupted or even fail.

In some user equipment, any drift in timing between the radio transceiver equipment and the user equipment can be corrected for by the user equipment tracking and correcting for the drift in timing through an adjustment of the internal timing within the user equipment. However, by aligning timings to that of the radio transceiver equipment, the user equipment will now be out of synchronization with other system(s) with which it is in wireless communication, which could lead to a drop in quality, disruption or failure of the communication between the user equipment and this other system(s) with which it is in wireless communication.

It is an object of the present apparatus and method for sample clock correction to address inter alia these problems.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first aspect, the invention provides a radio transceiver apparatus configured to transmit and receive radio frequency signals, the apparatus comprising: a sample clock configured to generate samples at a clock frequency $f_s$; a processor configured to generate a transmission data stream signal, wherein the transmission data stream signal comprises frames separated by frame boundaries between the frames, and wherein the frames are comprised of at least one sample; and a sample clock correction unit; wherein: in a first transmission configuration when the clock frequency $f_s$ is greater than a desired clock frequency $f_r$, the sample clock correction unit is configured to insert at least one sample into at least one frame boundary between frames; or in a second transmission configuration when the clock frequency $f_s$ is less than a desired clock frequency $f_r$, the sample clock correction unit is configured to remove at least one sample from at least one frame boundary between the frames.

Preferably, the processor is further configured to process a reception data stream signal, wherein the reception data stream signal comprises frames separated by frame boundaries between the frames, and wherein the frames are comprised of at least one sample.

Preferably, in a first reception configuration when the clock frequency $f_s$ is greater than a desired clock frequency $f_r$, the sample clock correction unit is configured to remove at least one sample from at least one frame boundary between frames of the reception data stream signal; or wherein in a second reception configuration when the system clock frequency $f_s$ is less than a desired clock frequency $f_r$, the sample clock correction unit is configured to insert at least one sample into at least one frame boundary between the frames of the reception data stream signal.

Preferably, the transmission data stream is a digital signal.

Preferably, the reception data stream is a digital signal.

Preferably, the apparatus further comprises a data converter configured to process the transmission data stream and/or to process the reception data stream.

Preferably, the apparatus further comprises an RF module configured to modulate the transmission data stream to generate an RF transmission signal and/or to demodulate an RF reception signal to generate the reception data stream.

Preferably, the RF module comprises an antenna and the apparatus is configured to transmit a wireless RF transmission signal and/or receive a wireless RF reception signal.

Preferably, the apparatus is configured to transmit an RF transmission signal and/or receive a RF reception signal using a cable.

Preferably, the apparatus is configured to transmit the RF transmission signal to a mobile telephone.

Preferably, the apparatus is configured to receive the RF reception signal from a mobile telephone.

Preferably, the sample clock is configured to generate samples at a clock frequency $f_s$ derived from a base clock frequency $f_b$.

Preferably, the clock frequency $f_s$ is equal to the base clock frequency $f_b$.

Preferably, the clock frequency $f_s$ corresponds to a frequency used in mobile telephone technology.

Preferably, the clock frequency $f_s$ corresponds to a mobile telephone standard.

Preferably, the apparatus complies with a GSM and/or 3GPP technology standard.

In a second aspect, the invention provides a radio transmitter apparatus configured to transmit radio frequency signals, the apparatus comprising: a sample clock configured to generate samples at a clock frequency $f_s$; a processor configured to generate a transmission data stream signal, wherein the transmission data stream signal comprises frames separated by frame boundaries between the frames, and wherein the frames are comprised of at least one sample; and a sample clock correction unit; wherein: in a first transmission configuration when the clock frequency $f_s$ is greater than a desired clock frequency $f_r$, the sample clock correction unit is configured to insert at least one sample into at least one frame boundary between frames; or in a second transmission configuration when the clock frequency $f_s$ is less than a desired clock frequency $f_r$, the sample clock correction unit is configured to remove at least one sample from at least one frame boundary between the frames.

In a third aspect, the invention provides a radio receiver apparatus configured to receive radio frequency signals, the apparatus comprising: a sample clock configured to generate samples at a clock frequency $f_s$; a processor configured to receive a reception data stream signal, wherein the reception data stream signal comprises frames separated by frame boundaries between the frames, and wherein the frames are comprised of at least one sample; and a sample clock correction unit; wherein: in a first reception configuration when the clock frequency $f_s$ is greater than a desired clock frequency $f_r$, the sample clock correction unit is configured to remove at least one sample from at least one frame boundary between frames; or wherein in a second reception configuration when the clock frequency $f_s$ is less than a desired clock frequency $f_r$, the sample clock correction unit is configured to insert at least one sample into at least one frame boundary between the frames.

In a fourth aspect, the invention provides a computer implemented system configured to transmit and receive radio frequency signals comprising the apparatus according to the first aspect.

In a fifth aspect, the invention provides a computer implemented system configured to transmit radio frequency signals comprising the apparatus according to the second aspect.

In a sixth aspect the invention provides a computer implemented system configured to receive radio frequency signals comprising the apparatus according to the third aspect.

In a seventh aspect, the invention provides a method of transmitting and receiving radio frequency signals, the method comprising: generating samples at a clock frequency $f_s$; generating a transmission data stream signal, wherein the transmission data stream signal comprises frames separated by frame boundaries between the frames, and wherein the frames are comprised of at least one sample; wherein in a first transmission configuration when the clock frequency $f_s$ is greater than a desired clock frequency $f_r$, at least one sample is inserted into at least one frame boundary between frames; or wherein in a second transmission configuration when the clock frequency $f_s$ is less than a desired clock frequency $f_r$, at least one sample is removed from at least one frame boundary between the frames.

Preferably, a reception data stream signal is processed, wherein the reception data stream signal comprises frames separated by frame boundaries between the frames, and wherein the frames are comprised of at least one sample.

Preferably, in a first reception configuration when the clock frequency $f_s$ is greater than a desired clock frequency $f_r$, at least one sample is removed from at least one frame boundary between frames of the reception data stream signal; or wherein in a second reception configuration when the clock frequency $f_s$ is less than a desired clock frequency $f_r$, at least one sample is inserted into at least one frame boundary between the frames of the reception data stream signal.

In an eighth aspect, the invention provides a computer implemented system configured to transmit and/or receive radio frequency signals according to the method of the seventh aspect.

The preferred features may be combined as appropriate, as would be apparent to a skilled person, and may be combined with any of the aspects of the invention.

DESCRIPTION OF FIGURES

The invention will now be described in detail with reference to the following figures in which:

FIGS. 2a, 2b and 2c are representational timing diagrams of the system shown in FIG. 1 when no sample clock correction is being applied;

FIGS. 3a and 3b are representational timing diagrams of the system shown in FIG. 1 when sample clock correction is being applied;

Figure 1:
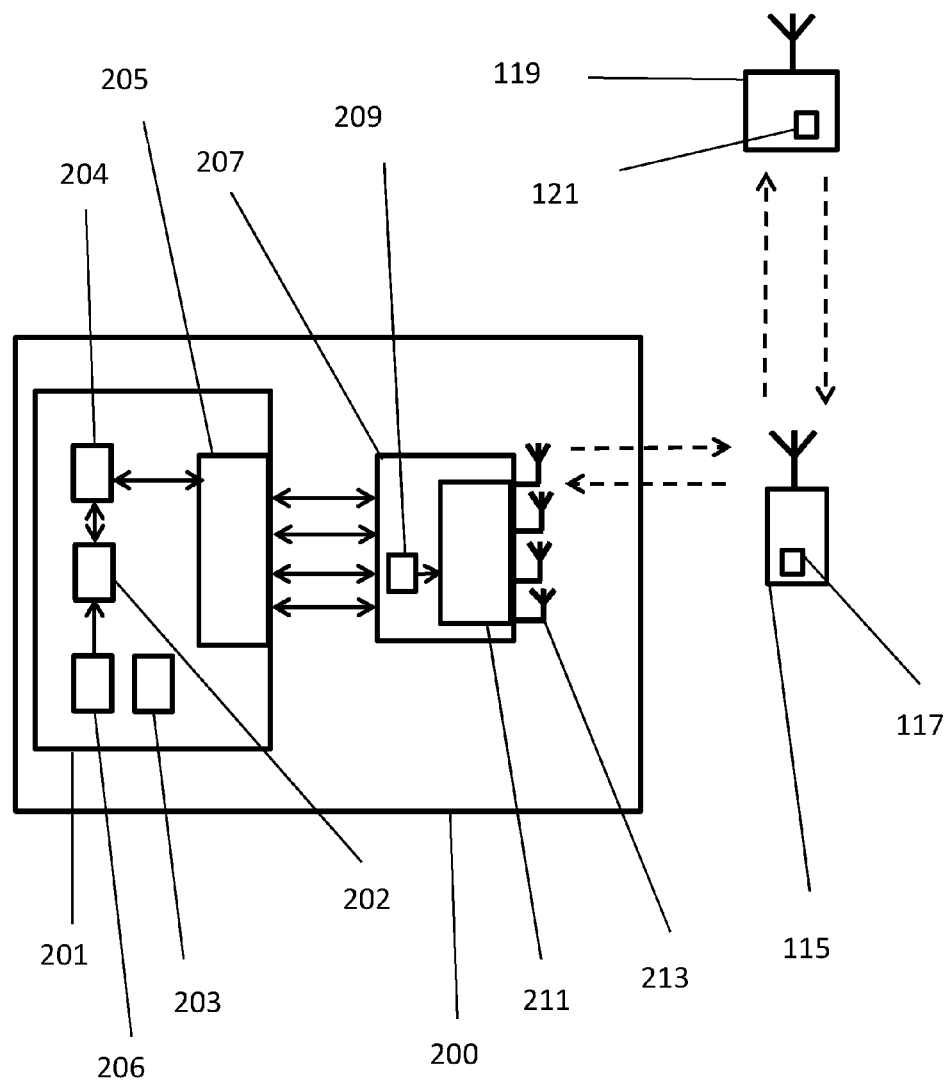
FIG. 1 is a diagram of a wireless radio transceiver system according to an embodiment of the present invention.

Embodiments according to the invention will now be described by way of example only.

It will be appreciated that although features from each of the embodiments may be identified by different reference numerals in the figures and throughout the description, similar features including the properties and functionality attributed thereto from one embodiment may be interchangeable with those of another embodiment.

DETAILED DESCRIPTION OF THE INVENTION

FIG. 1 shows a radio transceiver system or apparatus 200 according to an embodiment of the invention. The radio transceiver apparatus 200 is an example of a radio access technology (RAT) apparatus and is configured to transmit and receive radio frequency signals.

The apparatus 200 has a signal processing module 201 connected to an RF module 207. The signal processing module 201 has a processor 202 connected to sample clock correction unit 204. The sample clock correction unit 204 is also connected to a data converter 205.

The Data Converter 205 in the illustrated example is a bidirectional device which operates as both a digital to analogue converter in the transmit direction and as an analogue to digital converter in the receive direction. However, it will be appreciated that in some examples a separate digital to analogue converter may be used in the transmit direction and a separate analogue to digital converter may be used in the receive direction.

The apparatus 200 also has a baseband sample clock 203. The baseband clock 203 operates at a frequency $f_b$. The baseband clock 203 preferably has associated additional circuitry that operates to generate a system clock 206 operating at a frequency $f_s$. In this example, the system clock 206 is connected to the processor 202. Preferably, the system clock frequency $f_s$ is locked to and derived from the baseband clock frequency $f_b$, and ideally the signal processing module 201 is configured in order that the system clock frequency $f_s$ is consistent with an industry standard. In the illustrated embodiment, the system clock frequency $f_s$ should ideally be at a frequency of 122.88 MHz. The frequency of 122.88 MHz is herein termed a standard reference frequency $f_r$. The standard reference frequency $f_r$ can also be termed the desired clock frequency $f_r$ because this is the desired frequency of the system clock 206.

It is to be noted that the above standard reference frequency $f_r$ of 122.88 MHz, is only one example of a standards compliant implementation frequency and that other standard reference frequencies $f_r$ are possible depending on hardware topology chosen, as will be appreciated by the person skilled in the art.

In the event that the baseband sample clock 203 has an incorrect frequency of operation $f_b$, that is an incorrect frequency to that required, this systematic error in the frequency $f_b$ will lead to a corresponding error in the system clock frequency $f_s$, so that the system clock frequency $f_s$ is not at the desired clock frequency $f_r$.

In the illustrated embodiment, the systematic error in the system clock frequency $f_s$, produced by any error in the baseband clock frequency $f_b$, is corrected for by the sample clock correction unit 204, as will be discussed in more detail below.

The signal processing module 201 is connected to the RF module 207 through four channels. The RF module 207 has a transceiver 211 connected to four antennas 213. The transceiver is connected to an RF clock 209. The transceiver 211 is configured to accept signals from the Data Converter 205 of the signal processing module 201 over the four channels, and to modulate the signals, which are then transmitted wirelessly via the antennas 213 as RF transmission signals. The RF transmission frequency of the RF transmission signal is derived from the RF clock 209.

In alternative examples where the apparatus 200 is used in a testing environment, the apparatus 200 may be arranged to transmit RF transmission signals to an item or items of equipment under test via cabled connections connecting antenna ports of the apparatus 200 to the equipment under test, rather than transmitting the signals wirelessly via the antennas 213. In such examples, the cabled connections may be made via a specialized connector cable assembly.

It will also be appreciated that although four antennas and four channels are depicted in this example, that the signal processing module 201 may be configured with any number or arrangement of these sub modules or units.

The RF clock 209 of the RF module 207 is locked to system clock 206 of the signal processing module 201 and therefore is locked in turn to the baseband clock 203 of the signal processing unit 201. Although the RF clock 209 is locked to the baseband clock 203 and system clock 206, the RF clock 209 operates at a different frequency to the baseband clock frequency $f_b$ and system clock frequency $f_s$. The RF clock 209 operates at a frequency $f_{rf}$ and may be used to generate an RF carrier frequency which ideally is at an industry standard frequency. The industry standard applying could be that of the Global system for Mobile Communications (GSM) or 3$^{rd}$ Generation Partnership Project (3GPP) for example.

However, as discussed above, if the baseband clock 203 operates at an incorrect frequency $f_b$, this will lead to the system clock frequency $f_s$ being at an incorrect frequency. As explained above, where the RF clock 209 is locked to the system clock 206, this therefore leads to the transmission of signals at a frequency other than the intended industry standard.

In order to prevent this and allow radio transceiver apparatus 200 to transmit and receive signals in compliance with industry standards a correction is applied by the sample clock correction unit 204 to correct for the effects of the error in the baseband clock frequency $f_b$ of the baseband clock 203.

In use, the radio transceiver apparatus 200 communicates with user equipment 115 using RF signals. User equipment 115 has a user equipment clock 117, which operates at a frequency, or optionally, is used to generate a frequency at an industry standard reference frequency. The user equipment 115 uses the user equipment clock 117 to produce a user equipment RF clock frequency to enable communication with the radio transceiver apparatus 200, and preferably any other apparatus transmitting signals at an industry standard frequency that has similarly been derived from a clock assumed to be operating at the same frequency as the user equipment clock 117. User equipment 115 could be, but is not limited to, a mobile telephone, tablet, or other similar wireless communication device.

In the illustrated example, user equipment 115 is also in wireless communication with an external synchronous system 119, such as a Global Positioning System (GPS) apparatus. The external synchronous system 119 has an external synchronous system clock 121, which operates at a frequency, or is used to generate a frequency, at an industry standard frequency. The external synchronous system 119 uses external synchronous system clock 121 to produce an RF clock frequency to enable radio communication with other apparatus transmitting and receiving signals at an industry standard frequency that has been similarly been derived from a clock operating at the same frequency as the external synchronous system clock 121.

It is not essential that the external synchronous system 119 is present. The external synchronous system 119 is shown in this illustrated example to illustrate possible problems which may arise in operation, as will be discussed in more detail below.

In use, processor 202 generates a transmission data stream signal. The transmission data stream may be made up of individual digital samples that make up frames of data encompassing information to be transmitted. The frames of data may be separated one from the other by frame boundaries, and in some examples, or at some times, there may be gaps at the frame boundaries between the frames of data; however, in some examples under ideal conditions there are no gaps at the frame boundaries between the frames of data. The digital samples may generated at the system clock frequency $f_s$, derived from and locked to the base clock frequency $f_b$ as discussed above.

In examples where the transceiver 200 is a mobile phone base station, the transmission data stream could form part of normal mobile telephone operation and be used to transmit a telephone call. In examples where the transceiver 200 is a test apparatus, the transmission data stream produced by the processor 202 within signal processing unit 201 could be used to test Radio Access Technology (RAT) protocol integrity using the specific radio transceiver apparatus under test. Test specifications may, for example, be based on 3GPP technical specifications.

The transmission data stream is sent to the sample clock correction unit 204. As discussed above, the sample clock correction unit 204 applies a correction to correct for the effects of the error in the baseband clock frequency $f_b$ of the baseband clock 203. This correction comprises the data stream from the processor 202 being corrected such that it appears to have been generated at the correct system clock frequency $f_s$. The operation of the sample clock correction unit 204 is discussed in further detail below. The corrected transmission data stream is then sent from the sample correction unit 204 to the Data Converter 205, where the digital signal is converted to an analogue signal. The analogue signal is sent to the RF module 207. The analogue signal is modulated/up-converted onto the RF carrier frequency to produce a RF transmission signal. Transceiver 211 then transmits this RF transmission signal to user equipment 115.

User equipment 115 may also transmit a wireless RF signal that is received by an antenna 213 of the RF module 207 as an RF reception signal.

In alternative examples where the apparatus 200 is used in a testing environment, the apparatus 200 may be arranged to receive RF signals from an item or items of equipment under test via cabled connections connecting antenna ports of the apparatus 200 to the equipment under test, rather than transmitting the signals wirelessly via the antennas 213. In such examples, the cabled connections may be made via a specialized connector cable assembly.

Transceiver 211 demodulates the RF reception signal, and using the RF clock 209, the frequency of the demodulated signal is down-converted in an opposite manner to the up-conversion that occurs during transmission to produce an analogue reception signal. The analogue reception signal is sent over one of the four channels to the Data Converter 205 of the signal processing signal module 201. The Data Converter 205 converts the analogue reception signal into a digital reception data stream signal that is sent to the sample clock correction unit 204. The sample clock correction unit 204 applies the inverse of the correction that was applied for transmission, as is discussed in further detail below, and the resultant signal is sent to the processor 202.

The sample clock correction unit 204 corrects the data stream from the processor 202 intended for transmission and the digital reception data stream signal to account for the error in an incorrect baseband frequency $f_b$ that leads to an incorrect system frequency $f_s$ that differs from the ideal reference frequency $f_r$. The correction applied by the sample clock correction unit 204 within the wireless transceiver apparatus 200 is such that user equipment 115 in communication with the wireless transceiver apparatus 200 does not determine that any RF transmission signal it receives from the wireless transceiver apparatus 200 was derived from an incorrect system frequency $f_s$ different from the ideal frequency $f_r$. This means that user equipment 115 in communication with the wireless transceiver equipment 200 does not determine that there is an error in the frequency of the RF transmission signal it receives.

As discussed in further detail below, this means that user equipment 115 does not apply a self-correction in timing, which means that with respect to communication between the user equipment 115 and optionally any external synchronous apparatus 119 with which it is communicating, the integrity of that communication is maintained.

In some implementations, a set-up procedure for the wireless transceiver apparatus 200 may be used. In such implementations, calibration equipment is used to determine the frequency of operation of the baseband clock $f_b$ and, if this frequency is not at the desired correct frequency, uses the determined frequency to set-up operation of the sample clock correction unit 204, such that it applies the correct correction to the transmission data stream and to the reception data stream.

The problem associated with the baseband clock 203 operating at an incorrect frequency $f_b$ leading to an incorrect system clock frequency $f_s$, that is at a frequency other than that at the intended industry standard reference frequency $f_r$, for example 122.88 MHz, and the manner in which the correction is carried out is best understood by first considering the situation which would arise if the sample clock correction unit 204 was not present so that no correction was made.

A problem that will arise is that the user equipment 115 will perceive a drift in timing of the signals from the wireless transceiver apparatus compared to the internal clock timing of the user equipment 115. If the baseband clock 203 operates at a frequency that is too high, leading to a system clock frequency $f_s$ higher than that intended, without correction, the timing of the RF transmission signal received by the user equipment 115 will pull ahead of the internal timing of the user equipment 115, because the user equipment clock 117 is operating at the correct frequency. Similarly, if the baseband clock 203 operates at a frequency that is too low leading to a system clock frequency $f_s$ lower than that intended, without correction timing of the RF transmission signal received by the user equipment 115 will lag behind the internal timing of the user equipment 115, because the user equipment clock 117 is operating at the correct frequency.

This drift in timing may cause wireless communication between the wireless transceiver apparatus 200 and the user equipment 115 to drop in quality, become disrupted, or even fail. In some wireless communication protocols, the user equipment 115 may respond to this drift in timing by applying a self-correction to adjust its internal timing to match that of the RF transmission signal coming from the wireless transceiver apparatus 200. In general, the self-correction is periodically applied when the timing drift between the received RF transmission signal from the wireless transceiver apparatus 200 and the internal clock 117 exceeds a threshold value. This means that the integrity of both signal reception from and signal transmission to wireless transceiver apparatus 200 is maintained.

However, even where the user equipment 115 is able to do this, the self-correction may cause problems. For example, in the illustrated example a problem may arise because user equipment 115 is in wireless communication with external synchronous system 119 in addition to the wireless transceiver apparatus 200. By applying a self-correction to align timings with the wireless transceiver apparatus 200, user equipment 115 will place itself out of synchronization with the external synchronous system 119, because external synchronous system clock 121 operates at the correct frequency and in effect the self-adjustment of the user equipment clock 117, which was operating at the correct frequency, has adjusted the user equipment clock 117 to operate at an incorrect frequency that matches that of wireless transceiver equipment 200 when the sample clock correction unit 204 is not present.

FIGS. 2a, 2b, and 2c diagrammatically explain this problem where the user equipment 115 is able to carry out self-correction.

FIGS. 2a, 2b and 2c show a representational timing diagrams, where the relative timings of samples at the user equipment 115 are shown for the elements being discussed. The arrows in the figures represent the timing of common nth sample within a data stream after a reference time.

In FIG. 2a the arrows represent the timing of the $N_1{}^{th}$ sample after a reference time.

In FIG. 2a the baseband sample clock 203 is running at an incorrect frequency $f_b$ that is higher than it should be such that the system clock 206 is operating at a frequency $f_s$ that is also higher than the ideal frequency $f_r$. The $N_1{}^{th}$ sample from the system clock 206, which is derived from the sample clock 203, is represented as arrow 206a. Also shown is the $N_1{}^{th}$ sample from the user equipment clock 117 represented as arrow 117a, which may also represent the $N_1{}^{th}$ sample from the external synchronous system clock 121 as arrow 121a, where this is available. The user equipment clock 117 and the external synchronous system clock 121 as illustrated, are running in this example at the correct ideal frequency $f_r$. In this example, the baseband sample clock 203 and system clock 206 are running at too high a frequency, and this means that the $N_1{}^{th}$ sample 206a from the system clock 206 comes before the N1th samples 117a and 121a from the user equipment clock 117 and external synchronous system clock 121, by a drift time amount $T_{d1}$.

In FIG. 2b the arrows represent the timing of the $N_2{}^{th}$ pulses after a reference time, where $N_2 > N_1$.

At the later time of the $N_2{}^{th}$ samples the drift in signals has increased as shown in FIG. 2b, so that the drift time amount $T_{d2}$ between the $N_2{}^{th}$ sample from the system clock 206 represented as arrow 206a, and the $N_2{}^{th}$ sample from the user equipment clock 117 represented as arrow 117a and the $N_2{}^{th}$ sample from the external synchronous system clock 121 represented as arrow 121a is greater than the drift time amount $T_{d1}$.

In FIG. 2c the arrows represent the timing of the $N_3{}^{th}$ samples after a reference time, where $N_3 > N_2$.

The drift in time between the signal continues until eventually, by the time of the $N_3{}^{th}$ samples, the drift in time between the different signals is such that the drift time amount $T_d$ reaches a magnitude such that the user equipment 115 applies a self-correction 123, as shown in FIG. 2c, bringing the timing of the samples 117a of the user equipment clock 117 substantially back into agreement with the timing of the samples from the system clock 206 represented as arrow 206a. This is shown by arrow 117a moving from the position of arrow 121a to that at position 206a. This in effect means that the internal timing of the user equipment 115 is abruptly shifted to match that of the radio transceiver system 200 with which it is communicating. This means that the user equipment 115 applies a timing correction 123 such that the next sample 117a is effectively shifted in time.

It should be noted that it may not be possible in practice to self-correct by exactly the right amount such that $N_3{}^{th}$ samples represented by arrow 117a is exactly aligned with the $N_3{}^{th}$ samples represented by arrow 206a. In FIG. 2c, an idealized example is shown where the self-correction is exactly correct so that the arrows 206a and 117a are brought to the same position for reasons of clarity. However, it will be appreciated this may not always be achieved or achievable in practice.

In the illustrated example, because the user equipment 115 has applied a timing correction 123, the user equipment 115 is now out of synchronization with the external synchronous system 119 and this can lead to errors between the user equipment 115 and the external synchronous system 119, which could, for example, be a GPS system. The errors that can be caused will be apparent to the person skilled in the art. Recall, the sample clock correction unit 204 is considered to not be present in this discussion such that no correction in timing is being applied at the radio transceiver system 200.

It will be understood that if the baseband clock 203 operates at a frequency that is too low leading to a system clock frequency $f_s$ lower than that intended, the drift will occur in the opposite direction, and eventually the user equipment 115 will carry out a correction in the opposite sense.

Therefore, to address this problem, the embodiment of the present invention shown in FIG. 1 uses a sample clock correction unit 204.

The sample clock correction unit 204 receives a transmission data stream from the processor 202, the transmission data stream being made up of a series of samples generated at system clock frequency $f_s$ of the system clock 206 derived from the baseband clock 203. The data stream is made up of frames of data and frame boundaries. The frames are made from the samples generated at the system clock frequency $f_s$.

If the baseband sample clock 203 is running faster than ideal, the system clock 206 will also be running at a frequency greater than the ideal frequency $f_r$. To correct for this, the sample clock correction unit 204, with respect to the transmission data stream, may periodically insert a number of samples at frame boundaries between frames of data without affecting the frames of data themselves. The sample clock correction unit 204, with respect to the digital reception data stream, then removes the same number of samples from frame boundaries between the frames of data, again without affecting the frames of data themselves, at the same periodic positions to bring the frames back into the form output from the processor 202 such that the processor 202 can process the reception data stream.

If the baseband sample clock 203 is running slower than ideal, the system clock 206 will also be running at a frequency lower than the ideal frequency $f_r$. To correct for this, the sample clock correction unit 204, with respect to the transmission data stream, may periodically remove a number of samples from frame boundaries between frames of data without affecting the frames of data themselves. The sample clock correction unit 204, with respect to the digital reception data stream, then inserts the same number of samples in or at frame boundaries between the frames of data, again without affecting the frames of data themselves, at the same periodic positions to bring the frames back into the form output from the processor 202 such that the processor 202 can process the reception data stream.

In some examples, the removal of a number of samples from frame boundaries occurs from the initial samples of frames of data. Here, in some examples, insertion and removal of samples at frame boundaries that does not affect the frames of data means that the samples are inserted or removed without corrupting or significantly corrupting the frames of data themselves.

The number of samples inserted/removed in/out of the transmission data stream and digital reception data stream in combination with the period over which they are inserted/removed is such that over that period the number of frames in the transmission/reception data stream is consistent with a radio transceiver apparatus 200 operating at or close to the ideal frequency $f_r$, for example 122.88 MHz. The period over which samples are inserted/removed in/out of the data streams is determined by the clock correction unit 204 such that samples are inserted/removed in/out of the data streams before the drift in time between the radio transceiver apparatus 200 and the user equipment 115 is large enough for the user equipment to apply a self-correction. This means that the user equipment 115 continues to operate with a correct user equipment clock 117 that does not suffer an abrupt shift in time, and which remains synchronized with the external synchronous clock 121 of an external synchronous system 119.

This means that the processor 202 receives a digital reception data stream that has similar characteristics to that that was output by the processor 202, where the frames are characterized by the same number of samples as that for the transmitted signal. This means that the frame frequency received by the processor 202 is the same as the frame frequency transmitted by the processor 202. The processor 202 processes the digital reception data stream signal. In examples where the transceiver 200 is a test apparatus, and if, for example, a test specification was being run the integrity of the RAT radio transceiver is determined. In examples where transceiver 200 is a mobile phone base station the processor 202 can also process the signal as part of a telephone call.

This means that according to this embodiment of the present invention use of the sample clock correction unit 204 enables radio transceiver equipment to be used without the necessity of using very accurate baseband sample clocks such as those based on very accurate PLLs.

FIGS. 3a and 3b diagrammatically show this application of this embodiment of the present invention which shows the effect of the sample clock correction unit. FIGS. 3a and 3b are similar to FIGS. 2a, 2b and 2c.

In FIG. 3a the arrows represent the timing of the $N_4^{th}$ pulses after a reference time.

In FIG. 3a the baseband sample clock 203 is running at an incorrect frequency $f_b$ that is greater than it should be such that the system clock 206 is operating at a frequency $f_s$ that is also greater than the ideal frequency $f_r$, because the system clock frequency $f_s$ is derived from the baseband clock frequency $f_b$. The $N_4^{th}$ sample from the system clock 206 represented as arrow 206a. Also shown are the $N_4^{th}$ sample from the user equipment clock 117 represented as arrow 117a and the $N_4^{th}$ sample from the external synchronous system clock 121 represented as arrow 121a. In this example the baseband sample clock 203 and system clock 206 are running at too high a frequency, and this means that the $N_4^{th}$ sample from the system clock 206 comes before the $N_4^{th}$ samples 117a and 121a from the user equipment clock 117 and external synchronous system clock 121.

In FIG. 3b the arrows represent the timing of the $N_5^{th}$ pulses after a reference time, where $N_5>N_4$.

In FIG. 3b, at a later time just before the $N_5^{th}$ pulses the drift between the user equipment 115 timing and radio transceiver 200 timing is not sufficient for the user equipment 115 to apply a self-correcting timing correction. However, at this time the sample clock correction unit 204 inserts a number of samples in frame boundaries between frames such that the sample corresponding to the $N_5^{th}$ pulse is in effect shifted to a later time; as a result, the time occupied by data frames as they stretch out from a reference origin time has been increased to that which would have been occupied by data frames generated at the ideal or close to the ideal frequency $f_r$.

Figure 4:
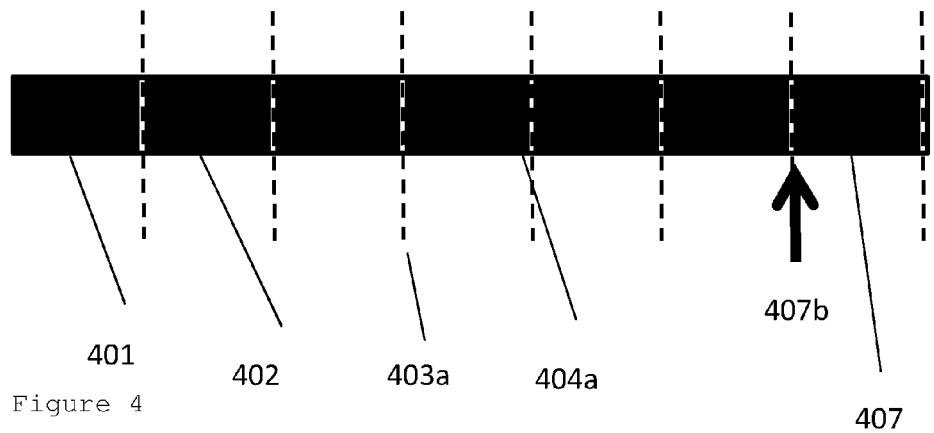
FIG. 4 shows a temporal representation of a data stream comprising frames separated by frame boundaries, according to an ideal system with an ideal baseband frequency.
Figure 5:
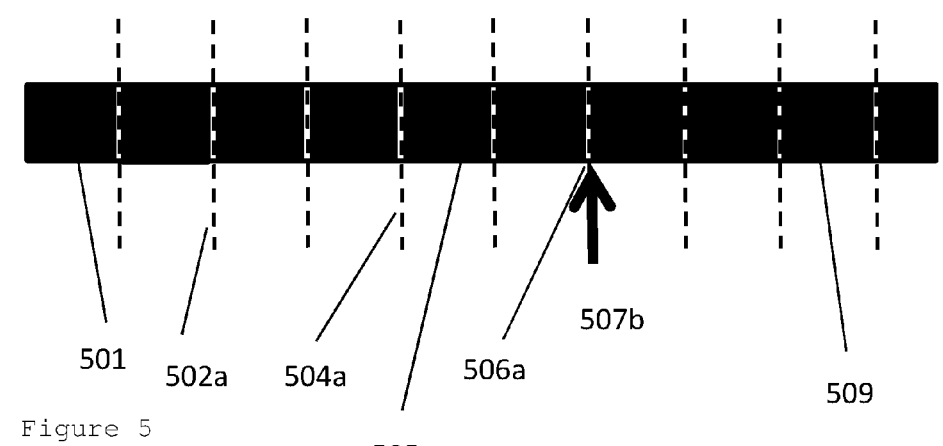
FIG. 5 shows a temporal representation of a data stream comprising frames separated by frame boundaries, according to the system shown in FIG. 1, when no sample clock correction is being applied and where the baseband frequency is higher than the ideal.
Figure 6:
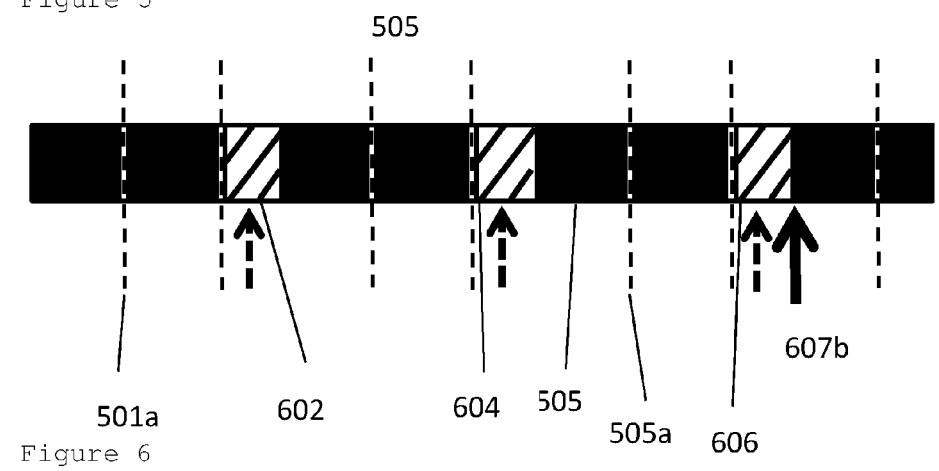
FIG. 6 shows a temporal representation of a data stream comprising frames separated by frame boundaries, according to the embodiment of the present invention shown in FIG. 1, when sample clock correction is being applied and where the baseband frequency is higher than the ideal.
Figure 7:
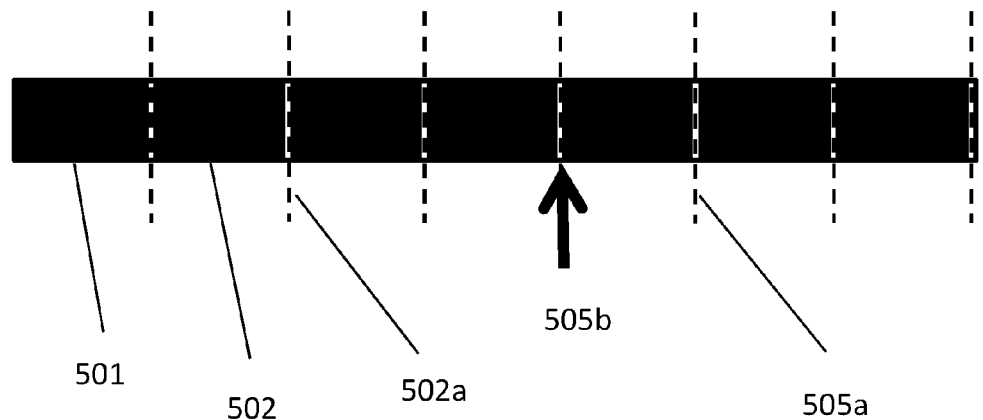
FIG. 7 shows a temporal representation of a data stream comprising frames separated by frame boundaries, according to an ideal system with an ideal baseband frequency and reproduces the data stream shown in FIG. 4.
Figure 8:
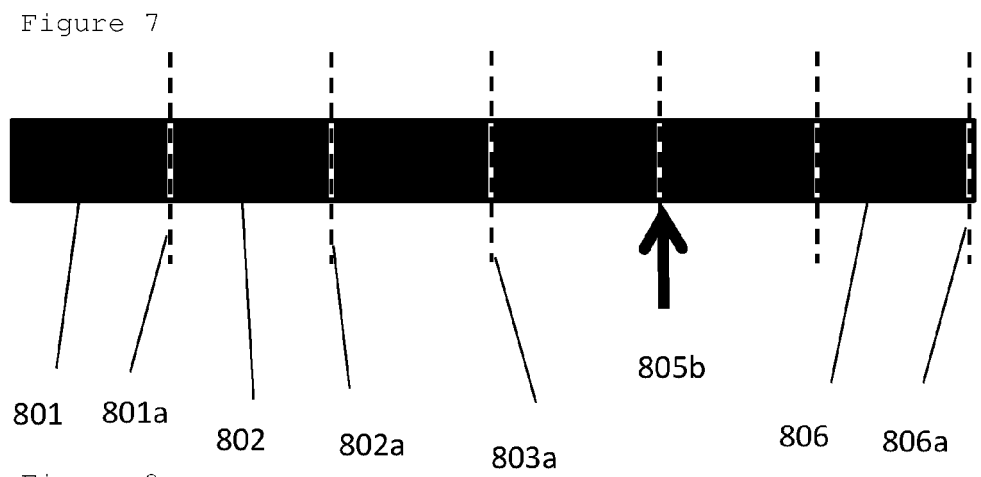
FIG. 8 shows a temporal representation of a data stream comprising frames separated by frame boundaries, according to the system shown in FIG. 1, when no sample clock correction is being applied and where the baseband frequency is lower than the ideal.
Figure 9:
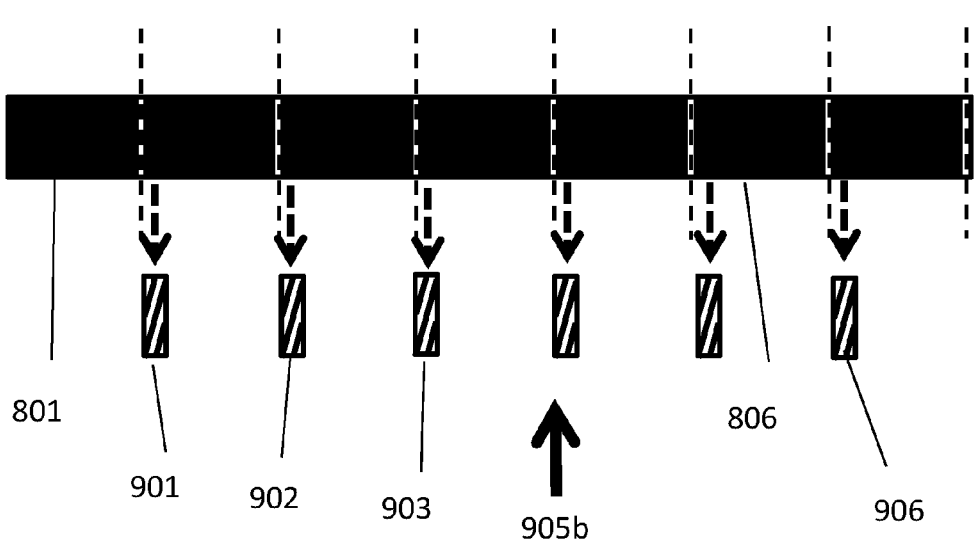
FIG. 9 shows a temporal representation of a data stream comprising frames separated by frame boundaries, according to the embodiment of the present invention shown in FIG. 1, when sample clock correction is being applied and where the baseband frequency is lower than the ideal.

The effect of the insertion/deletion of samples into or from frame boundaries between frames of data in transmission/reception data streams is further explained with respect to FIGS. 4, 5 and 6 together and with respect to FIGS. 7, 8, and 9 together.

FIG. 4 shows a transmission data stream 400 transmitted by a processor comprising frames of data separated by frame boundaries between the frames, the data stream can be considered to occupy a length in time. In FIG. 4 the system is ideal and the frames are made from samples generated at the ideal frequency $f_r$. The first, second and seventh frames are identified as 401, 402, and 407 respectively. The frame boundaries between the third and fourth frames, and between the fourth and fifth are identified at the positions of dashed lines 403a and 404a respectively. The beginning of the seventh frame is identified as 407b. Transmission data stream 400 could be that expected to be received by user equipment 115.

FIG. 5 shows a similar transmission data stream 500 to that shown in FIG. 4, except that the baseband clock frequency $f_b$ is larger than it should be leading to system frequency $f_s$ that is greater than the ideal $f_r$. The transmission data stream 500 has been generated by a radio transceiver apparatus 200 having a fast baseband clock and no sample clock correction unit. The first, fifth and ninth frames are identified as 501, 505, and 509 respectively and the frame boundaries between the second and third frames, between the fourth and fifth frames, and between the sixth and seventh frames are identified at the positions of dashed lines 502a, 504a and 506a respectively. The beginning of the seventh frame is identified as 507b, which is clearly now shifted from the position of the ideal start to the seventh frame, identified as 407b in FIG. 4.

It is clear that when the baseband clock is running too fast, there is a drift in timing between the expected timing of a system operating at the ideal frequency and the actual timing of the system operating at too high a frequency.

FIG. 6 shows the effect of the sample clock correction unit 204 according to an embodiment of the invention when applied to radio transceiver apparatus 200. Additional samples 602, 604, and 606 have been inserted into frame boundaries 502a, 504a, and 506a to form a corrected transmission data stream 600. This has in effect increased the length of time occupied by the transmission data stream such that the beginning of seventh the frame identified as 607b now aligns up with the beginning of the seventh frame 407b for the ideal system as shown in FIG. 4. This means that according to an embodiment of the invention, on a periodic basis the timing drift between the radio transceiver apparatus 200 and user equipment 115 can be corrected such that the user equipment does not perform a self-correction timing procedure.

In a similar manner to correction of the transmission data stream upon receipt of the reception data stream equivalent samples to those that have been inserted are deleted from frame boundaries between frames. This means that the data stream that is then processed by the processor 202 is at the same frame rate as that generated by the processor for transmission in the first instance.

In FIG. 6, samples are shown having been inserted in alternate frame boundaries between frames such that the period over which samples are inserted is two frames. It will be appreciated that this is only an example and the period over which samples are inserted could be any number of frames long, such as 1, 2, 4, 10, 20, 33, 1001 or any other number of frames. Furthermore, over a period of, for example, 1001 frames samples need not be inserted within just one frame boundary between frames over that period but could be inserted at more than one frame boundary between frames.

Furthermore, for the reception data stream samples need not be deleted from the same frame boundary between frames as those for which the samples were inserted into the transmission data stream. Therefore, with respect to the example shown in FIGS. 5 and 6 where samples were inserted into evenly numbered frame boundaries between frames (502*a*, 504*a* etc.), upon receipt of the reception data stream samples could be deleted from the oddly numbered frame boundaries between frames (501*a*, 503*a* etc.). This also means that if, for example, over a period of three frames three samples were inserted into one frame boundary between frames for the transmission data stream, for the reception data stream three samples could be deleted from a different frame boundary between frames, or two samples deleted from one frame boundary between frames with one sample deleted from a different frame boundary between frames, or one sample could be deleted from each frame boundary between frames over the three frame period. The converse also applies where for a three frame period a single sample could have been inserted into each frame boundary between frames for the transmission data stream and for the reception data stream three samples could have been removed from one frame boundary between frames.

FIG. 7 again shows the transmission data stream 400, and is reproduced here simply for reasons of clarity, except now the beginning of the fifth frame is identified as 505*b*.

FIG. 8 shows a similar transmission data stream 800 to that shown in FIG. 7, except that the baseband clock frequency $f_b$ is lower than it should be leading to system frequency $f_s$ that is lower than the ideal $f_r$. The transmission data stream 800 has been generated by radio transceiver apparatus 200 having a slow baseband clock and no sample clock correction unit. The first, second and sixth frames are identified as 801, 802, and 806 respectively and the frame boundaries between the first and second frames, between the second and third frames, between the third and fourth frames, and between the sixth and seventh frames are identified as 801*a*, 802*a*, 803*a* and 806*a* respectively. The beginning of the fifth frame is identified as 805*b*, which is clearly now shifted from the position of the ideal start to fifth frame, identified as 405*b* in FIG. 7.

It is clear that when the baseband clock is running too slow, there is a drift in timing between the expected timing of a system operating at the ideal frequency and the system operating at too low a frequency.

FIG. 9 shows the effect of the sample clock correction unit 204 according to an embodiment of the invention when applied to radio transceiver apparatus 200. Samples have been removed from the frame boundary between frames in this example, where for example samples 901, 902, 903, and 906 have been removed from between frames 801*a*, 802*a*, 803*a*, and 806*a*, to form a corrected transmission data stream 800. This has in effect reduced the length of time occupied by the transmission data stream such that the beginning of the fifth frame identified as 905*b* now aligns up with the beginning of the fifth frame 505*b* for the ideal system. This means that according to an embodiment of the invention, on a periodic basis the timing drift between the radio transceiver apparatus 200 and user equipment 115 can be corrected such that the user equipment does not perform a self-correction timing procedure.

In FIG. 9, a sample has been deleted from each frame boundary between frames, but as discussed above, this need not be the case and FIGS. 7 to 9 are only used to help visualize the working of a specific, non-limiting example of the invention. As discussed above in relation to FIGS. 5 and 6 it is clear that similarly for the transmission data stream samples could have been removed from different frame boundaries to the frame boundaries that have samples inserted for the reception data stream.

As mentioned above, in some examples, the signal processing module 201 operates at a frequency different to 122.88 MHz, such that the baseband clock 203 and system clock 206 could operate at any required frequency.

In some examples, the system clock 206 and the baseband clock 203 operate at the same frequency.

In some examples, the RF clock 209 operates at a frequency other than a known multiplier of the baseband clock frequency $f_b$.

In some examples, the RF clock 209 operates at a frequency other than a known multiplier of the system clock frequency $f_s$.

In some examples, the signal processing module 201 is connected to the RF module 207 through more or less than the four channels used in the illustrated embodiment, and could be connected through any number of channels (1 to N). Therefore, in some examples the RF module 207 has a transceiver connected to (1 to N) antennas 213.

In some examples, the radio transceiver system or apparatus 200 is a test apparatus and emulates (1 to N) antenna paths.

In some examples, the radio transceiver apparatus 200 does not operate wirelessly, in such examples cables may be used to transmit and receive RF signals. Such examples may be used in implementations where the radio transceiver system or apparatus 200 is a test apparatus emulating a wireless radio transceiver.

In some examples, communication between the user equipment 115 and external synchronous system 119 is not conducted wirelessly, rather cables are used to transmit and receive RF signals. Such examples may be used in implementations where the radio transceiver system or apparatus 200 is a test apparatus emulating a wireless radio transceiver.

In some examples, the signal processing module 201 and RF 207 are a single unit.

In some examples, the Data Converter 205 comprises more than one converter. In some examples, the number of converters may match the number of channels (1 to N).

As discussed above, in some examples, the Data Converter 205 comprises a separate digital to analogue converter and a separate analogue to digital converter.

In some examples, the baseband clock 203 operating at an incorrect frequency $f_b$ may not lead to an error in RF clock frequency $f_{rf}$ but can still lead to an error in the RF transmission signal. This is because the baseband signal is modulated and up-converted to produce an RF signal modulated onto an RF carrier frequency generated using RF clock frequency $f_{rf}$, and in these examples the RF frequency $f_{rf}$ may not be in error. However, in these examples because there is a frequency error in the signal modulated onto the RF carrier frequency, this still leads to an error in the RF transmission signal.

In some examples, the error in the baseband sampling clock frequency fb may be a known stable error. In such examples, calibration equipment may not be required to determine the frequency of operation of the baseband clock.

In some examples, any of the baseband clock 203, processor, sample clock correction unit 204 or Data Converter 205 can be located within the RF module 207.

In some examples, any of the RF clock 209, transceiver 211 or antennas 213 can be located in the signal processing unit 201.

In some examples, the functioning of any or all of the components of the signal processing module 201 can be carried out substantially in software and/or firmware.

In some examples, the functioning of any or all of the components of the RF module 207 can be carried out at least partially in software and/or firmware.

In some examples, some of the components of the RF module 207 can be carried out in software and/or firmware, with some of the components of the RF module 207 carried out in hardware.

In some examples, a radio transceiver apparatus may be used to generate a transmission data stream and transmit an RF transmission signal, and a separate radio transceiver apparatus may be used to receive an RF reception signal and process a reception data stream, where insertion/deletion of samples into transmission/reception data streams is carried out according to an embodiment of the present invention as described above.

In some examples, a signal processor module may be used to generate a transmission data stream and a separate signal processor module may be used to process a reception data stream, where insertion/deletion of samples into transmission/reception data streams is carried out according to an embodiment of the present invention as described above. A common RF module could be used with both signal processing units.

As will be appreciated by the person skilled in the art that it is possible to carry out the present invention in a software only or part-software environment. In such arrangements, the wireless radio transceiver apparatus does not need all of the standard hardware associated with such equipment as discussed above by way of example. Hence, other embodiments of the invention are configured to transmit and receive radio frequency signals in software environments running on computer platforms and without standard hardware.

The hardware elements, operating systems and programming languages of such computers maybe conventional in nature, and it is presumed that those skilled in the art are adequately familiar therewith. Of course, the functions may be implemented at least in part in purpose built hardware or in application specific firmware. Any component or function described, some of which are necessary to perform the inventions, may be distributed in any suitable fashion across a number of components or platforms, to distribute the processing load.

Here, aspects of the methods and apparatuses described herein can be executed on a computing device such as a server or standalone workstation. Program aspects of the technology can be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution. Hence, a machine readable medium may take many forms, including but not limited to, a tangible storage carrier, a carrier wave medium or physical transaction medium. Non-volatile storage media include, for example, optical or magnetic disks, such as any of the storage devices in computer(s) or the like, such as may be used to implement specific apparatus elements, etc. shown in the drawings. Volatile storage media include dynamic memory, such as the main memory of a computer platform. Tangible transmission media include coaxial cables; copper wire and fiber optics, including the wires that comprise the bus within a computer system. Carrier-wave transmission media can take the form of electric or electromagnetic signals, or acoustic or light waves such as those generated during radio frequency (RF) and infrared (IR) data communications. Common forms of computer readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will appreciate that while the foregoing has described what are considered to be the best mode and, where appropriate, other modes of performing the invention, the invention should not be limited to specific apparatus configurations or method steps disclosed in this description of the preferred embodiment. It is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Those skilled in the art will recognize that the invention has a broad range of applications, and that the embodiments may take a wide range of modifications without departing from the inventive concept as defined in the appended claims.

It will be understood that the present invention has been described above by way of example only, and variations in detail are possible within the scope of the invention.

The invention claimed is:

1. A radio transceiver apparatus configured to transmit and receive radio frequency signals, the radio transceiver apparatus comprising:

a sample clock configured to generate samples at a clock frequency $f_s$;

a processor configured to generate a transmission data stream signal, wherein the transmission data stream signal comprises frames separated by frame boundaries between the frames, and wherein the frames are comprised of at least one sample; and a sample clock correction unit;
wherein:
in a first transmission configuration when the clock frequency $f_s$ is greater than a desired clock frequency $f_r$, the sample clock correction unit is configured to insert at least one sample into at least one frame boundary between frames; and
in a second transmission configuration when the clock frequency $f_s$ is less than a desired clock frequency $f_r$, the sample clock correction unit is configured to remove at least one sample from at least one frame boundary between the frames.

2. The radio transceiver apparatus of claim 1, wherein the processor is further configured to process a reception data stream signal, wherein the reception data stream signal comprises frames separated by frame boundaries between the frames, and wherein the frames are comprised of at least one sample.

3. The radio transceiver apparatus of claim 2, wherein in a first reception configuration when the clock frequency $f_s$ is greater than a desired clock frequency $f_r$, the sample clock correction unit is configured to remove at least one sample from at least one frame boundary between frames of the reception data stream signal; or
wherein in a second reception configuration when the system clock frequency $f_s$ is less than a desired clock frequency $f_r$, the sample clock correction unit is configured to insert at least one sample into at least one frame boundary between the frames of the reception data stream signal.

4. The radio transceiver apparatus of claim 1, wherein the transmission data stream is a digital signal.

5. The radio transceiver apparatus of claim 3, wherein the reception data stream is a digital signal.

6. The radio transceiver apparatus of claim 4, further comprising a data converter configured to process the transmission data stream and/or to process the reception data stream.

7. The radio transceiver apparatus of claim 1, further comprising an RF module configured to modulate the transmission data stream to generate an RF transmission signal and/or to demodulate an RF reception signal to generate the reception data stream.

8. The radio transceiver apparatus of claim 7, wherein the RF module comprises an antenna and the radio transceiver apparatus is configured to transmit a wireless RF transmission signal and/or receive a wireless RF reception signal.

9. The radio transceiver apparatus of claim 7, wherein the radio transceiver apparatus is configured to transmit an RF transmission signal and/or receive a RF reception signal using a cable.

10. The radio transceiver apparatus of claim 7, wherein the radio transceiver apparatus is configured to transmit the RF transmission signal to a mobile telephone.

11. The radio transceiver apparatus of claim 7, wherein the radio transceiver apparatus is configured to receive the RF reception signal from a mobile telephone.

12. The radio transceiver apparatus of claim 1, wherein the sample clock is configured to generate samples at a clock frequency $f_s$ derived from a base clock frequency $f_b$.

13. The radio transceiver apparatus of claim 12, wherein the clock frequency $f_s$ is equal to the base clock frequency $f_b$.

14. The radio transceiver apparatus of claim 1, wherein the clock frequency $f_s$ corresponds to a frequency used in mobile telephone technology.

15. The radio transceiver apparatus of claim 13, wherein the clock frequency $f_s$ corresponds to a mobile telephone standard.

16. The radio transceiver apparatus of claim 1, wherein the radio transceiver apparatus complies with a GSM and/or 3GPP technology standard.

* * * * *